Sept. 11, 1956 R. B. HERDEN 2,762,261
LENS MOUNT LOCKING DEVICE
Filed April 21, 1955 4 Sheets-Sheet 1
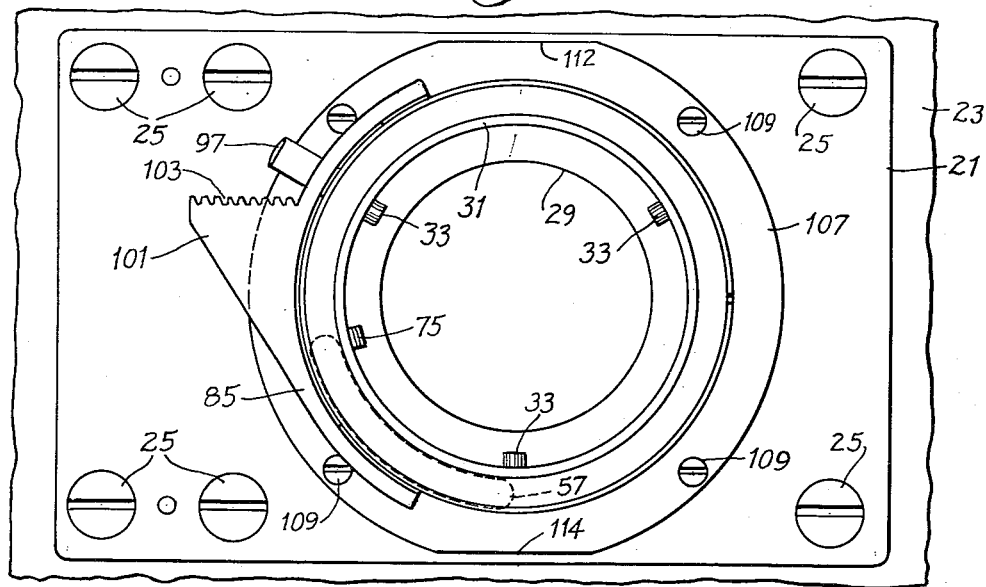
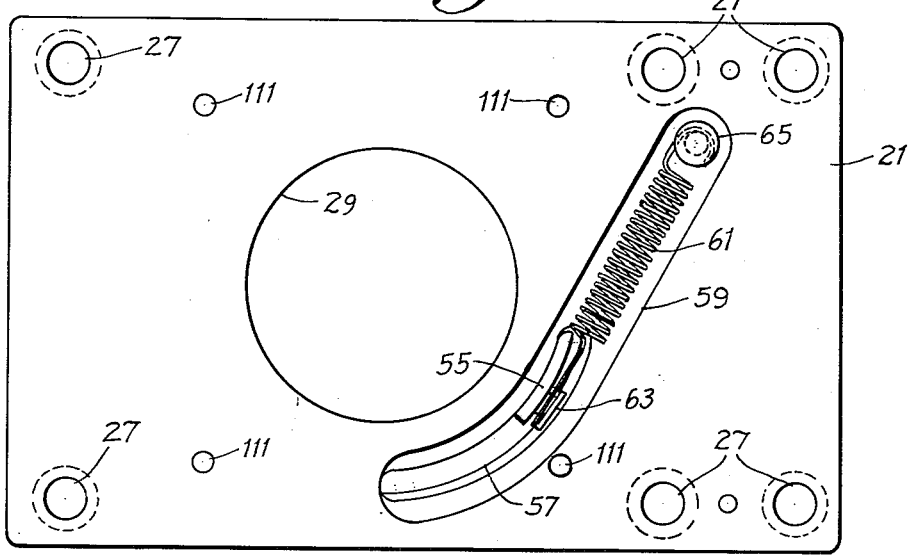
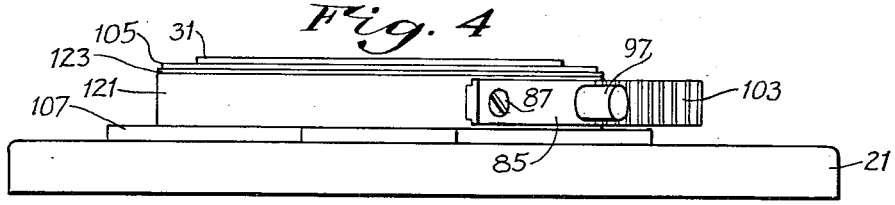

Sept. 11, 1956  R. B. HERDEN  2,762,261
LENS MOUNT LOCKING DEVICE
Filed April 21, 1955  4 Sheets-Sheet 2
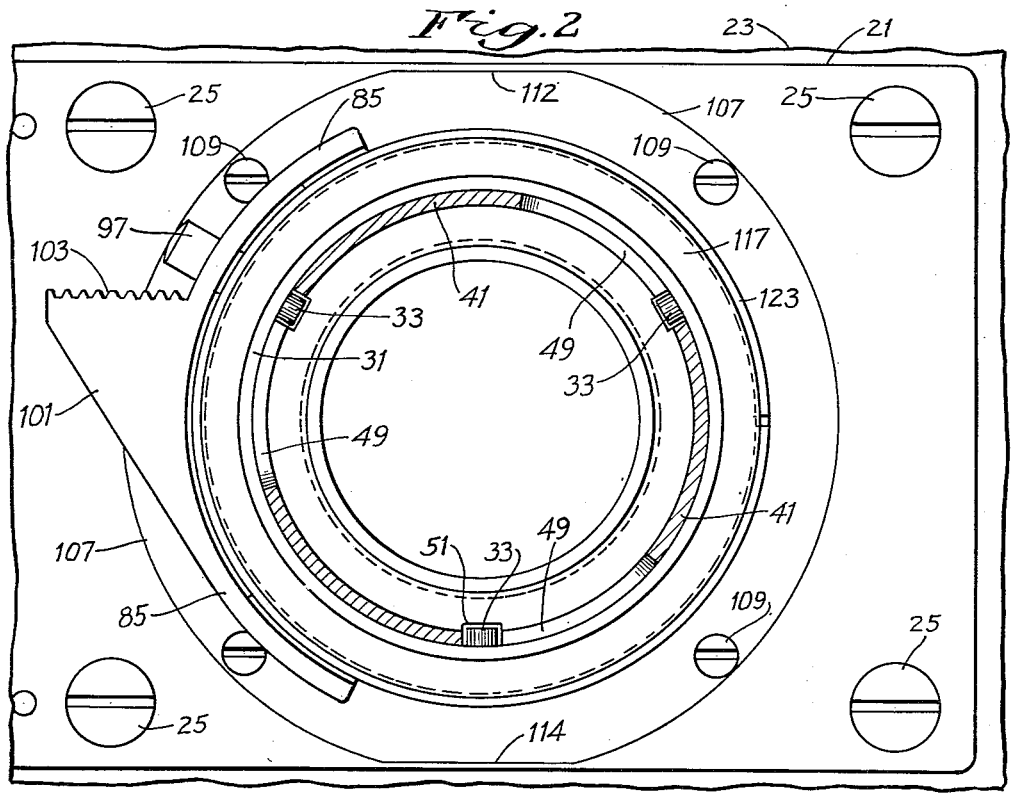
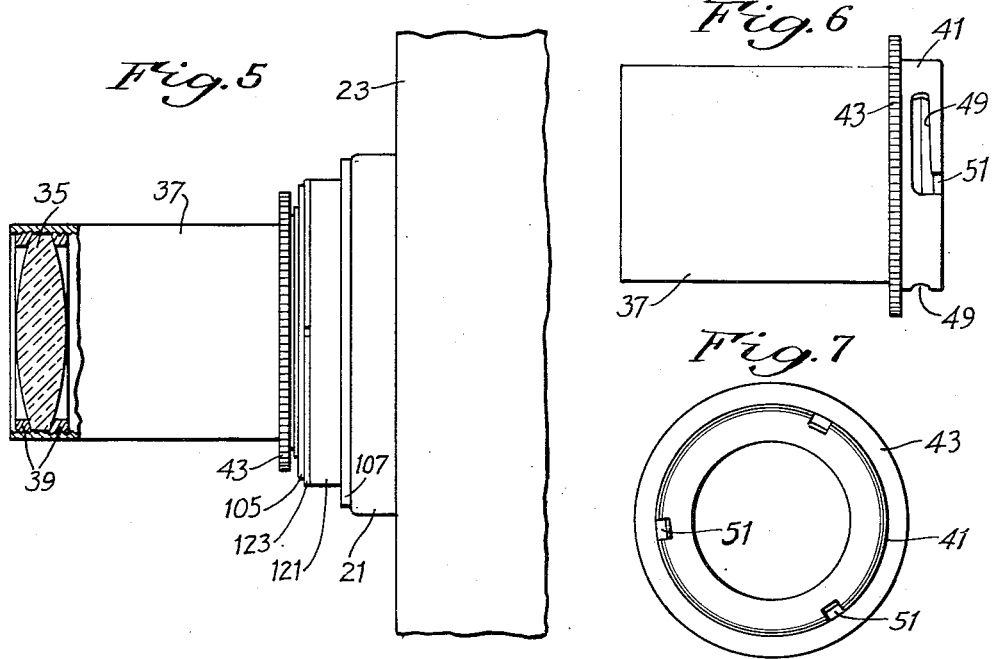

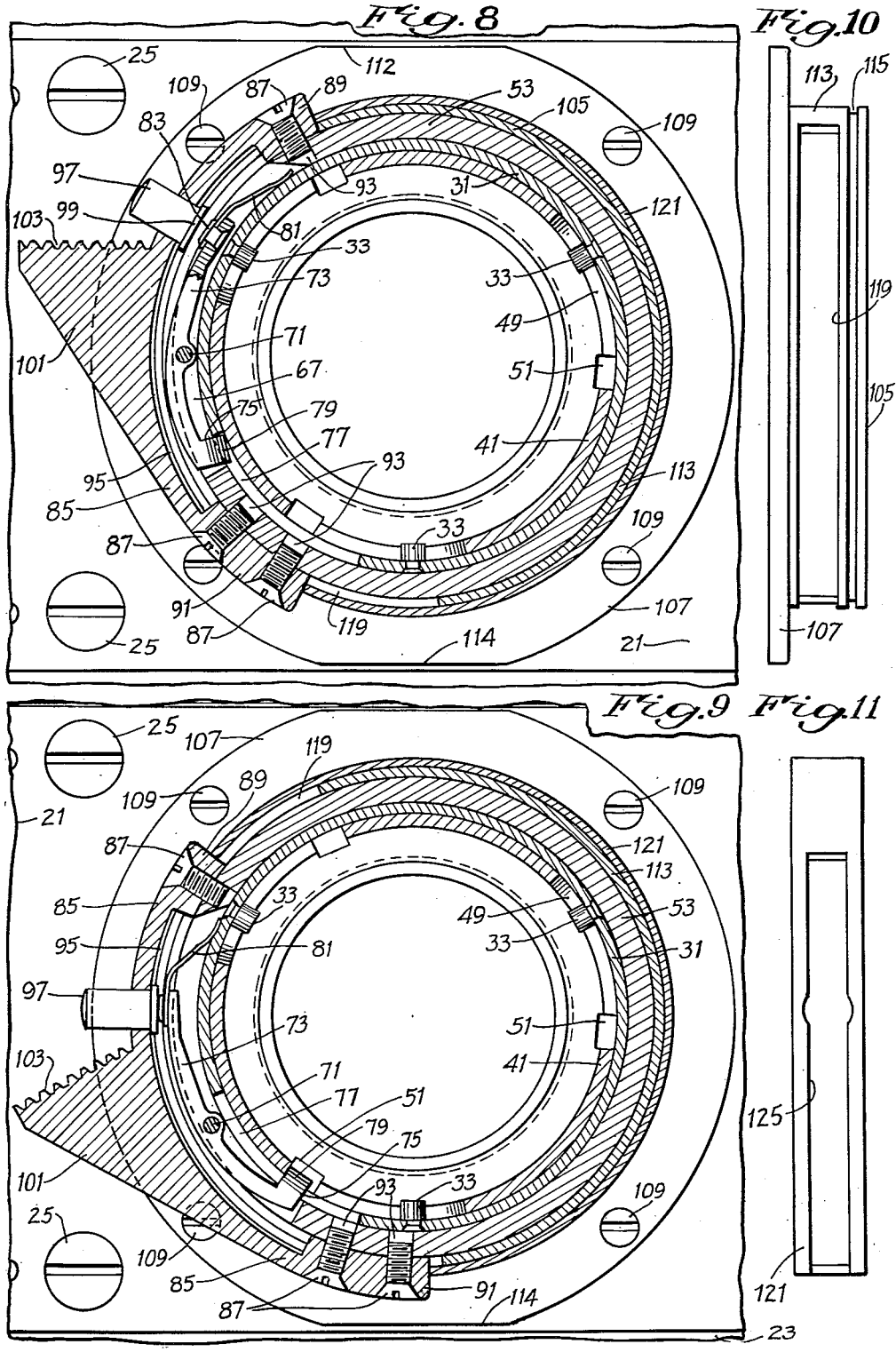

Sept. 11, 1956  R. B. HERDEN  2,762,261
LENS MOUNT LOCKING DEVICE
Filed April 21, 1955  4 Sheets-Sheet 4
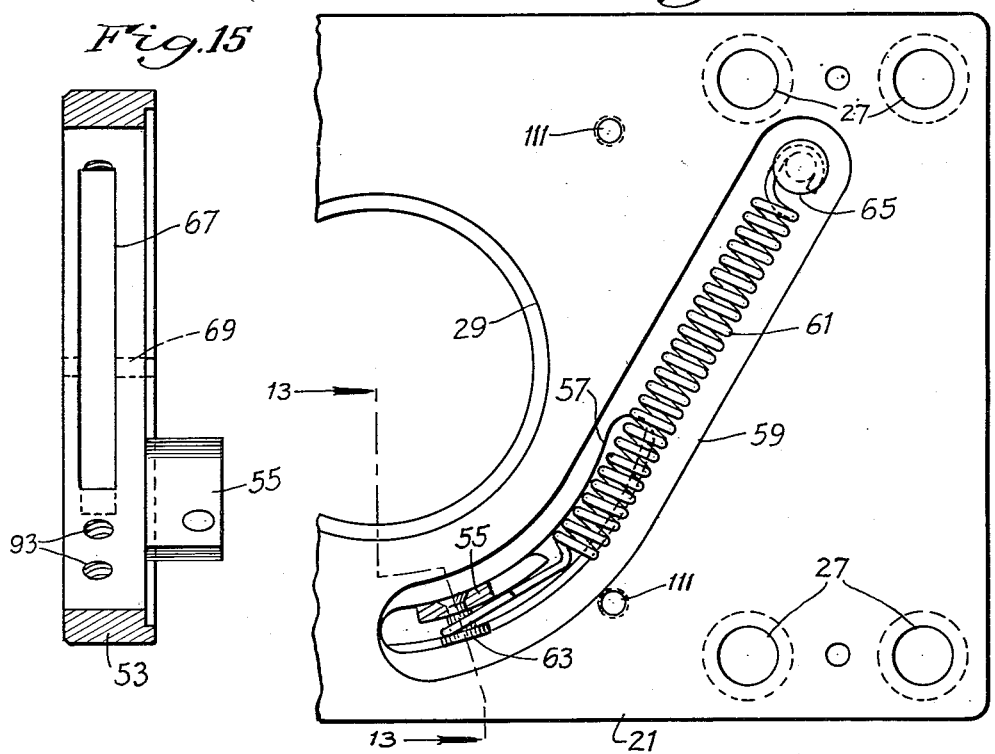
Fig. 12
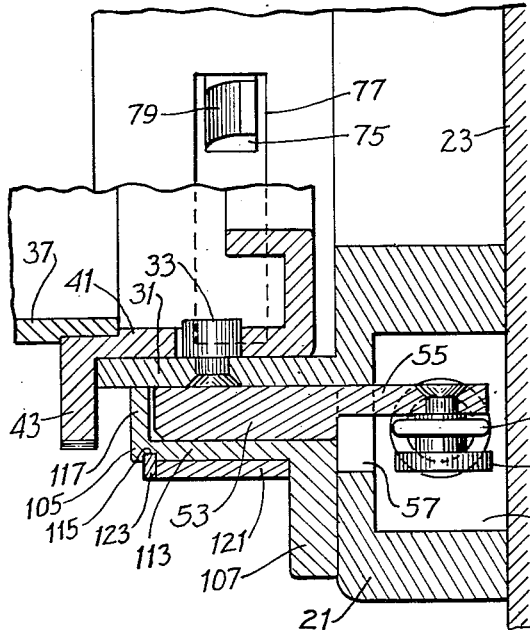
Fig. 13
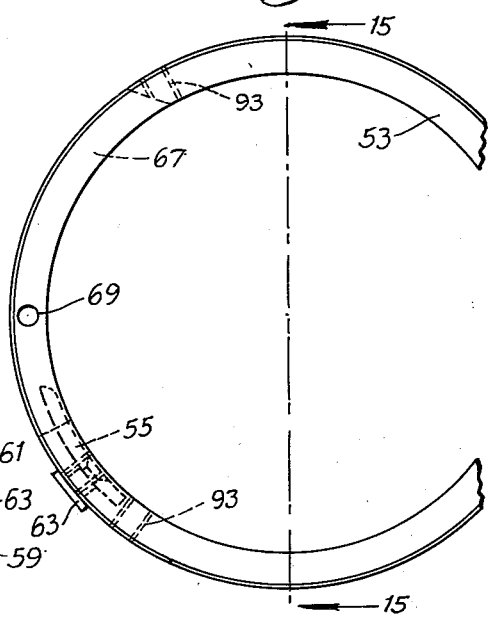
Fig. 14
Fig. 15

United States Patent Office 2,762,261
Patented Sept. 11, 1956

2,762,261

LENS MOUNT LOCKING DEVICE

Robert B. Herden, Webster, N. Y., assignor to Wollensak Optical Company, Rochester, N. Y., a corporation of New York Application April 21, 1955, Serial No. 502,792

9 Claims. (Cl. 88—57)

The invention relates to a locking device designed to maintain an interchangeable lens tightly in place on the front plate of a photographic camera, notwithstanding any vibrations to which the lens or the camera may be subjected to, yet be adapted for rapid removal.

An object of the invention is to provide a generally improved and more satisfactory lens locking device.

Another object is to provide a lens locking device which exerts a constant locking force directly on the interchangeable lens to draw it more tightly into fixed position.

Still another object is to present a lens locking device which provides a floating or self-adjusting connection between the camera front plate and the interchangeable lens by automatically adjusting itself to provide a constant locking force when the lens or the camera is subjected to vibrations.

A further object is the provision of a lens locking device which is adapted for use with interchangeable lenses of conventional construction and which entails a minimum amount of modification to the front plates of existing cameras.

A still further object is the provision of a compact lens locking device which is simple in operation and is formed of a minimum number of movable parts suitably protected from dust and other foreign matter.

A still further object is to provide a lens locking device which requires no special or fine adjustments, is adapted for manufacture by mass production methods, and does not affect the normal function of the camera itself whether an interchangeable lens is employed or not.

These and other desirable objects may be attained in the manner disclosed as an illustrative embodiment of the invention in the following description and in the accompanying drawings forming a part hereof, in which:

Fig. 1 is a front elevation of a fragment of a photographic camera showing the lens board or plate with the lens locking device of the present invention installed thereon, and with the interchangeable lens tube removed therefrom;

Fig. 2 is an enlarged view similar to Fig. 1 illustrating, in section, the interchangeable lens tube mounted on the front plate of the camera in the conventional manner;

Fig. 3 is a rear elevation of the lens plate in reversed position from that shown in Fig. 1;

Fig. 4 is a top plan of the lens board shown in Fig. 1, after being moved into a reversed position;

Fig. 5 is a side elevation of a fragment of a photographic camera showing a lens tube installed thereon, with a portion of its wall being broken away to illustrate the interior construction;

Fig. 6 is a side elevation of a conventional lens tube shown removed from the camera lens plate;

Fig. 7 is a rear elevation of the lens tube shown in Fig. 6;

Fig. 8 is a transverse vertical section taken through the structure shown in Fig. 2 illustrating the lens locking device of the present invention in its released or inoperative position;

Fig. 9 is a view similar to Fig. 8 showing the lens locking device in its operative position;

Fig. 10 is a right side elevation of the cover ring of the lens locking device of the present invention;

Fig. 11 is a right side elevation of the dust cover of the lens locking device;

Fig. 12 is a partial rear elevation of the camera front plate illustrating the parts, partly in section, as they appear when the lens locking device of the present invention is in operative position;

Fig. 13 is a section taken approximately on the line 13—13 of Fig. 12;

Fig. 14 is a partial front elevation of the pawl ring shown removed from the remainder of the lens locking device; and Fig. 15 is a section taken approximately on the line 15—15 of Fig. 14.

The same reference numerals throughout the several views indicate the same parts.

In certain types of photographic cameras, the use of various interchangeable lenses is often desirable or necessary. The conventional practice is merely to support the interchangeable lens on the front board or plate of a camera by means of cooperating pins and bayonet slots. However, in use this bayonet joint construction has been found to be unsatisfactory since any vibrations developed by the power or manual drive means of the camera or the vibrations which accompany manual movement of the camera itself may cause the lens to loosen and fall off the front plate of the camera. In accordance with the present invention, a lens locking device is provided which is designed to hold the lens tightly in place, notwithstanding any vibrations to which the lens may be subject to, yet permit instant removal when desired.

With reference to the preferred embodiment of the invention shown on the drawing, the lens locking device is adapted to be applied to the front or lens plate 21 of the photographic camera, shown in part at 23, with a minimum of modification of the conventional camera structure. The lens plate 21, as best seen in Fig. 1, is secured to the front wall of the camera 23 by any suitable means, such as screws 25 passing through the openings 27 in the lens plate, and is provided with an approximately central opening 29 alined with the optical axis of the camera. As in known constructions, an annular flange 31, of greater diameter than the central opening 29, projects forwardly from the lens plate 21 in coaxial relationship with the central opening. Along the internal surface of flange 31 are provided a plurality of radial pins or studs 33, with three such pins 33, being spaced approximately 120° as shown in Fig. 1, being the conventional construction.

The interchangeable lens, as for example the lens 35 diagrammatically shown in Fig. 5, is mounted within a cylindrical lens tube 37 by any suitable means, such as the retainer sleeves or rings 39. At the rear end of the lens tube structure there are the usual conventional bayonet slots 49, three in number to mate with the three retaining pins 33, the slots having open rear ends 51. These bayonet slots may be formed directly in the main lens tube itself, or in a separate ring 41 which constitutes the rear part of the lens tube structure or assembly and which is provided with a radially and circumferentially extending flange 43 knurled for easy grasping and turning. The main portions of the bayonet slots are slightly inclined or helical with respect to the rear end of the lens tube structure, as seen in Fig. 6.

In applying the interchangeable lens to the front plate of the camera, the lens tube 37 is inserted axially into the flange 31 with the open ends 51 of the bayonet slots 49 alined with the radial pins 33 of the annular flange, Then, by applying a clockwise turning movement to the flange 43 or other suitably grasped part, the lens tube assembly is rotated to advance the closed ends of the bayonet slots 49 toward their respective pins 33, thus drawing the lens tube assembly rearwardly (due to the inclination of the slots) until some suitable part of the tube structure (such as the rear end thereof, or the flange 43) becomes wedged tightly against some suitable cooperating stationary portion of the flange 31 or associated parts. This wedging action is relied upon, in previously known constructions, for maintaining the lens tube assembly in position on the front plate of the camera.

The structure thus far described is conventional and requires only slight modification, as hereinafter described, to accommodate the lens locking means of the present invention. With reference to Figs. 8 and 9, the lens locking device includes a pawl ring 53, mounted for rotary movement on the annular flange 31 of the front plate 21 and having a rearwardly extending arcuate lug 55, formed as a continuation of the internal periphery of the pawl ring, see Fig. 15. The lug 55 passes through an arcuate slot 57 formed in the front board 21, in concentric relationship with the central opening 29, and is received within a relatively wide groove 59, formed in the rear face of the front plate. The groove 59 includes a lower arcuate portion, shaped approximately concentrically with the slot 57, and a substantially straight portion extending approximately tangentially with respect to the lower arcuate portion, see Figs. 3 and 12. The pawl ring 53 is constantly urged in a clockwise direction, as viewed in Figs. 8 and 9, by a coiled tension spring 61, which is disposed within the groove 59 and has its ends secured to the lug 55 of the pawl ring 53 and the stationary front plate 21 by means of the headed studs 63 and 65, respectively.

As seen in Figs. 14 and 15, the pawl ring 53 is also provided with an arcuate slot 67 having its side walls disposed approximately parallel to the edge surfaces of the pawl ring 53. The upper end of the slot 67, as viewed in Fig. 14, lies approximately in a horizontal plane, while the lower end of the slot 67 extends substantially radially of the ring 53. Extending through the slot 67, at approximately right angles to the plane thereof, is an opening 69 in which is disposed a pivot pin 71 on which is mounted a pivotal locking pawl or trigger 73. On one end of the locking pawl 73 (the lower end as viewed in Figs. 8 and 9) is provided a locking ear or lug 75 extending toward the annular flange 31 with its center line forming approximately a 25° angle with a similar center line passing through the pin 71. The ear 75 is received within and is movable along an arcuate slot 77, formed in the annular flange 31 substantially parallel to its front edge, as seen in Figs. 8 and 13. When moved into operative locking position, the lug 75 of the locking trigger 73 is received within and bears against the opened end of the adjacent bayonet slot 49 of the lens tube connector ring 41, which is applied to the front plate of the camera in the usual manner, and thus the lug serves to lock the lens tube in place as more fully described hereinafter. To permit the locking lug 75 of the pawl 73 to be displaced automatically by the pressure of the rear edge of the lens tube, when the lens tube is being inserted into the flange 31, the outer surface of the lug 75 is provided with a beveled or rounded contour 79, as seen in Figs. 8, 9, and 13.

The opposite end of the locking pawl 73 is provided with a fixed flat spring 81 having one end secured, as by rivet 83, to the end of the pawl 73, while its free end rests against the outer surface of the annular flange 31. A constant counterclockwise force (as viewed in Fig. 8) is exerted on the locking pawl 73 by the spring 81, and thus the lug 75 of the pawl 73 at all times remains within the slot 77 of the annular flange 31, and is automatically driven into a bayonet slot 49 once it is alined therewith. The rivet 83, securing the spring to the locking pawl 73, and the locking lug 75 are approximately equally spaced from the pivot pin 71 of the pawl, and therefore any clockwise force applied to either end of the pawl will displace both ends equal arcuate distances in opposite directions.

As described above, the locking pawl 73 is moved into its operative position shown in Fig. 9, by rotating bodily the pawl ring 53 relative to the annular flange 31. This movement is accomplished by a locking or actuating lever 85 secured in place by flat headed screws 87 passing through the enlarged or thickened end portions 89 and 91 of the lever 85 and being threadedly received within the openings 93 in the pawl ring 53. It will be noted that the thickened end portions 89 and 91 provide the inner periphery of the lever 85 with a suitable channel or recess 95 into which the ends of the locking pawl are adapted to move in response to the resilient force exerted by the spring 81 or the release button 97. As best seen in Figs. 8 and 9, the release button 97 is disposed directly opposite the rivet 83, and is adapted for sliding movement relative to the lever 85 in approximately a radial direction, with its outward travel being limited by its enlarged or flanged end 99. To permit easy manipulation of the pawl ring 53, the actuating lever 85 is provided with a lateral outwardly extending arm 101 having a knurled or otherwise roughened surface 103 which functions as a gripping area for the operator's finger.

Disposed outwardly of the pawl ring 53 is a cover ring 105 (see Fig. 10) having an approximately circular flange 107 extending radially outwardly from its rear edge, and adapted to be fixed in place as by flat headed screws 109 threaded into the openings 111 in the front plate 21. As seen for example in Fig. 1, the periphery of the flange 107 is provided with flat portions 112 and 114 merely to confine the flange 107 within the limits of the front plate 21, it being understood that any desirable shaped flange may be employed without departing from the scope of the invention. The cover ring 105 also includes a tubular portion 113 having a snap ring retaining groove 115 spaced inwardly from its forward edge and extending along its outer periphery, and a radially directed flange 117 extending inwardly into contact with the periphery of the annular flange 31 and serving to maintain the pawl ring 53 in its axial position. As seen in Fig. 10, the tubular portion of the cover ring is also provided with a slot 119 through which the locking lever 85 is adapted to project. The slot 119 has a length slightly longer than the arcuate length of the locking lever and the arcuate distance traversed by the locking lever 85 as it is moved from its position shown in Fig. 8 to that of Fig. 9, and is provided with squared ends which function as stops, when engaged by the thickened ends 89 and 91 of the locking lever, to limit the rotation of the pawl ring 53.

Protection of the movable parts is afforded by a tubular dust cover 121 (see Fig. 11) mounted for rotary movement on the outer periphery of the cover ring, and held in its axial position by a split snap ring 123 seated within the groove 115 of the cover ring. An arcuate slot 125 is also provided in the dust cover 121, through which projects the locking lever 85. The slot 125 is in alinement with the similar slot 119 formed in the cover ring 105, but has an arcuate length substantially equal to that of the locking lever 85, as seen in Figs. 8 and 9 to provide snug contact with the ends thereof. As shown in Fig. 11, the walls of the slot 125 are made slightly wider in the area adjacent to the release button 97, to insure its free movement.

In describing the construction of the present invention, the individual elements have been described in a manner as to present a clear understanding of the structure, function, and mode of operation of the device, with little stress being given to the manner of assembly of the unit. From the above description and the illustrations on the drawing, the manner of assembly of the device becomes obvious, it being readily evident that certain parts, as for example the cover ring 105 and the dust cover 121, must be assembled into the unit before other parts, as for example the locking lever 85, even though they have been explained at a later stage of the description.

In use, the interchangeable lens tube is first applied to the annular flange 31 in the conventional manner, by aligning the open ends 51 of the bayonet slots 49 on the lens tube connector with the radial pins 33 on the flange 31, and then rotating the lens tube assembly clockwise to advance the closed ends of the bayonet slots 49 toward their respective pins 33. At this stage, the parts are in positions as shown in Fig. 2, after which the arm 101 of the locking lever 85 is then moved counterclockwise from its position shown in Fig. 8 to that shown in Fig. 9, thereby rotating the pawl ring 53 and dust cover 121 in the same direction and placing the coiled spring 61 under tension. During this movement, the lug 75 of the locking pawl 73 rides along the slot 77 formed in the annular flange 31 until it becomes alined with the entrance portion 51 of one of the bayonet slots 49, at which time it is automatically urged counterclockwise, as viewed in Fig. 9, by the fixed flat spring 81. Upon release of the arm 101, one side of the locking lug 75 engages with the wall of the open end of the bayonet slot 49 and prevents the pawl ring 53 and the locking lever 85 secured thereto from moving in a clockwise direction into their original positions.

With the parts disposed as shown in Fig. 9, the coiled spring 61, which had been tensioned during the counterclockwise movement of the locking lever 85 and the pawl ring 53, exerts a constant resilient force on the pawl ring 53, tending to turn it clockwise to its rest position shown in Fig. 8. The clockwise force on the pawl ring 53 is transmitted through the locking pawl 73 and its lug 75 to the connector member 41 of the interchangeable lens tube assembly. Thus, when the lens locking device of the present invention is placed in operative position (Fig. 9), the interchangeable lens tube is subjected to a steady clockwise force which tends to move the closed ends of the bayonet slots 49 of the lens tube assembly nearer to their respective pins 33, thereby increasing the wedging action between the pins 33 and the walls of the bayonet slots.

In removing the interchangeable lens tube, the operator merely depresses the release button 97, which in turn engages the upper end of locking pawl 73 and causes it to pivot clockwise. This movement of the pawl 73 withdraws the lug 75 from engagement with the connector 41 of the lens tube and permits the coiled spring 61 to automatically urge the pawl ring 53 clockwise to its rest position shown in Fig. 8. The interchangeable lens tube may be then removed in the conventional manner by rotating it counterclockwise until the pins 33 and the open ends of the beyonet slots 49 are alined, after which the lens tube may be withdrawn from the annular flange 31 by an axial movement away from the front plate 21. It will be noted that once the lens tube is removed from the front the locking device cannot be placed in locking position, thus the operator needs to perform no adjustments in preparing the device for use.

As described above, it is seen that the lens locking device of the present invention locks the lens table against rotation, in addition to subjecting it to a constant force tending to make more secure the connection between the lens tube and the front plate of the camera. It is evident that any vibrations imparted to the camera will not release the locking means but will be absorbed by the resilient member acting on the pawl ring of the locking device. Thus, the locking device can be described as a floating connection which adjusts itself automatically in response to any vibrations to which it may be subject. Further, it will be noted that the locking device of the present invention is adapted for use with lens tubes of conventional construction, having bayonet slots on their rear ends, without requiring any modification thereof.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. In a lens mount, the combination with a lens plate provided with a forwardly extending annular flange having a plurality of radial pins adapted to engage with the bayonet slots on an interchangeable lens tube, of a locking device mounted on said lens plate and including a pawl ring rotatably mounted on said annular flange and movable into a first position and second position, detent means carried by said pawl ring, said detent means being adapted to engage within a bayonet slot in said interchangeable lens tube when said lens tube is inserted within said annular flange with its bayonet slots engaged with said pins on said annular flange, said detent means being operative when said pawl ring is moved into said second position, and a release member carried by said pawl ring, said release member being adapted to disengage said detent means from said bayonet slot and permit said pawl ring to be moved into said first position.

2. A construction as defined in claim 1, wherein said detent means includes a pawl pivotally mounted on said pawl ring.

3. A construction as defined in claim 2, further including resilient means adapted to urge said pawl into engagement with the bayonet slot in said interchangeable lens tube.

4. A construction as defined in claim 1, further including a cover ring mounted on said annular flange outwardly of said pawl ring, said cover ring being fixed to said lens plate and being adapted to maintain said pawl ring in axial position on said annular flange.

5. A construction as defined in claim 4, further including a dust cover mounted on said cover ring and adapted for rotatable movement thereon, said dust cover being movable with said pawl ring as it is turned into said first and second positions.

6. A construction as defined in claim 5, wherein said pawl ring is provided with an actuating lever projecting through slots formed in said cover ring and said dust cover inot an accessible position outwardly of said locking device.

7. A construction as defined in claim 1, further including resilient means operatively connected to said pawl ring and said lens plate, said resilient means urging said pawl ring into said first position.

8. In a lens mount, the combination with a lens plate provided with a forwardly extending annular flange having a plurality of radial projections adapted to engage within the bayonet slots on an interchangeable lens tube, of a locking device mounted on said lens plate and including actuating means movable relative to said annular flange into a first position and a second position, and locking means movable into operative position as said actuating means is moved into said second position, said locking means, in operative position, being adapted to engage with a bayonet slot in said interchangeable lens tube whereby insertion of a lens tube within said annular flange allows said locking means to hold said lens tube in fixed position and prevent disengagement of said radial projection from said bayonet slots.

9. Latching means adapted to latch a camera lens mount releasably to a camera body part, the lens mount being of the type rotatable in one direction relative to the camera body to secure the mount to the body part and rotatable in the opposite direction relative to the camera body to disengage the mount from the body part, said latching means comprising a rotary member mounted on said camera body part for turning movement substantially about the optical axis of the lens mount, spring means tending to turn said rotary member in a lens-securing direction, a portion of said rotary member being accessible for manual turning in an opposite direction against the force of said spring means, a pawl pivotally mounted on said rotary member and having a lug tending to make latching engagement with an abutment shoulder on the lens mount to tend to turn the lens mount in the same securing direction in which said spring means tends to turn said rotary member, to keep the lens mount firmly secured to the camera body part notwithstanding vibrations of said body part, and means for releasing said lug of said pawl from said abutment shoulder on said lens mount, so that said pawl will not interfere with turning said lens mount freely in an opposite direction when it is desired to disengage the lens mount from the camera body part.

References Cited in the file of this patent

UNITED STATES PATENTS

| | | |
|---|---|---|
| 1,720,224 | Lessler et al. | July 9, 1929 |
| 1,760,827 | Goldhammer | May 27, 1930 |
| 2,110,477 | Wittel | Mar. 8, 1938 |
| 2,136,149 | Nuchterlein | Nov. 8, 1938 |
| 2,260,991 | Gorey | Oct. 28, 1941 |
| 2,461,357 | Broido et al. | Feb. 8, 1949 |
| 2,496,928 | Bing et al. | Feb. 7, 1950 |
| 2,618,201 | Brohl et al. | Nov. 18, 1952 |
| 2,649,024 | Goldhammer | Aug. 18, 1953 |
| 2,715,854 | Simmons et al. | Aug. 23, 1955 |